United States Patent [19]

Cornin

[11] 4,414,597

[45] Nov. 8, 1983

[54] FLOPPY DISC LINER

[75] Inventor: Annamaria Cornin, Plainsboro, N.J.

[73] Assignee: Chicopee, New Brunswick, N.J.

[21] Appl. No.: 301,915

[22] Filed: Sep. 14, 1981

[51] Int. Cl.³ .......................................... G11B 23/02
[52] U.S. Cl. ..................................... 360/133; 428/64;
                                                                428/900
[58] Field of Search ................. 428/296, 900, 300, 64,
                                                      428/65; 360/133

[56] References Cited

U.S. PATENT DOCUMENTS

| | | | |
|---|---|---|---|
| 4,129,675 | 12/1978 | Scott | 428/296 |
| 4,223,361 | 9/1980 | Zaitsu et al. | 428/900 |
| 4,239,828 | 12/1980 | Knope et al. | 428/900 |
| 4,251,843 | 2/1981 | Masuyama et al. | 360/133 |
| 4,315,965 | 2/1982 | Mason et al. | 428/296 |
| 4,354,213 | 10/1982 | Martinelli | 428/900 |

Primary Examiner—William R. Dixon, Jr.
Attorney, Agent, or Firm—Charles J. Metz

[57] ABSTRACT

The invention relates to a fabric that is particularly suitable for use as a liner for floppy disc containers, and to such containers utilizing the fabric of this invention as a liner.

2 Claims, 4 Drawing Figures

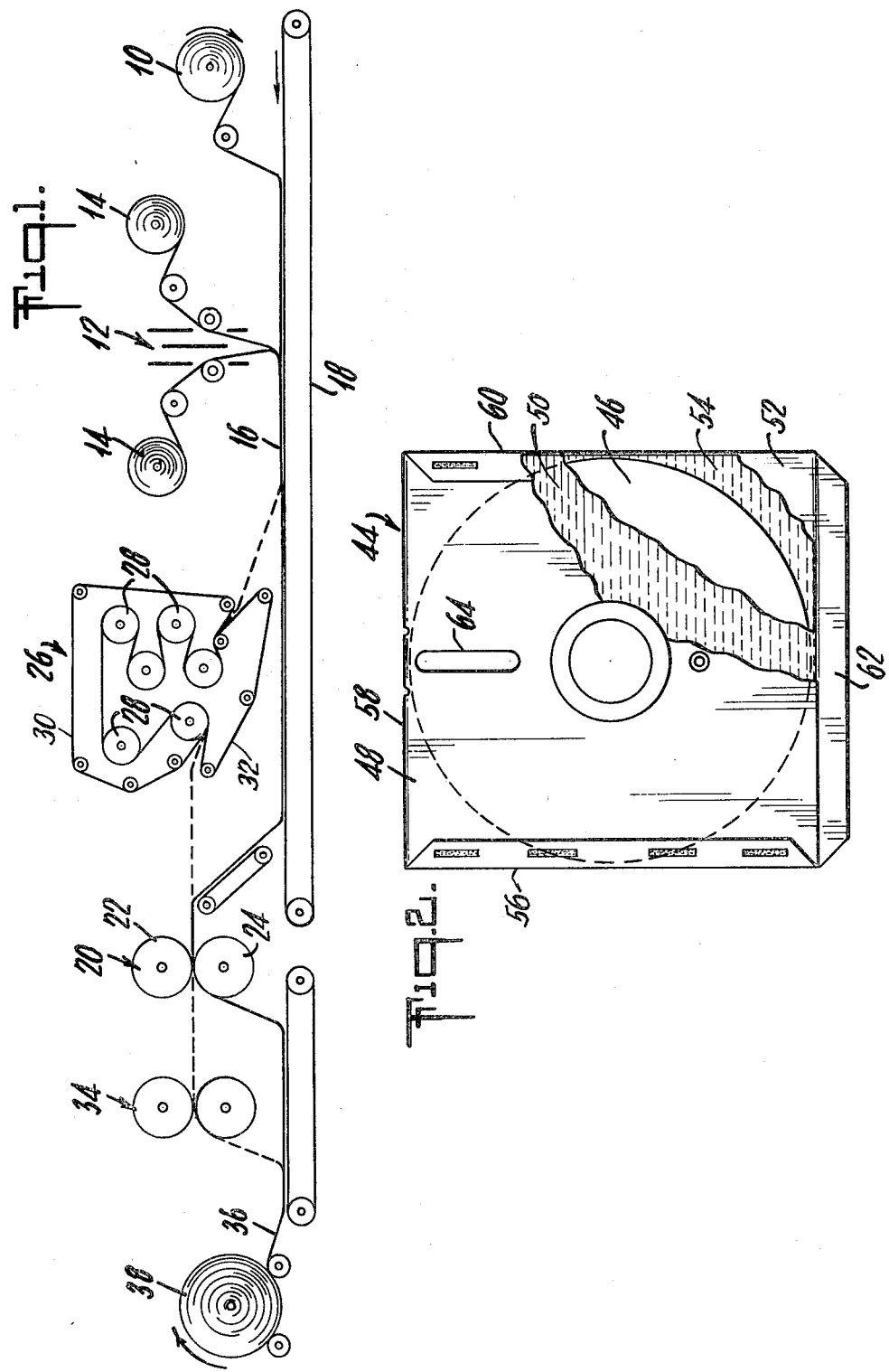

FLOPPY DISC LINER

BACKGROUND OF THE INVENTION

Floppy discs are employed as data storage means with computers and data processing equipment. The floppy discs are made of flexible plastic film (e.g., polyester) containing a coating that is sensitive to magnetic impulses. The discs resemble 45 rpm phonograph records in overall size and configuration, except that they contain no grooves.

The discs are stored in protective envelope containers, which are not removed when the disc is used. Rather, the floppy disc in its container is inserted in the data reading mechanism, and the disc is rotated in its container either to read the data stored on the disc or to impress new data on the disc.

The protective container must permit the floppy disc to rotate freely therein, and must not interfere with the magnetic impulses impressed on the disc. Heretofore, various fabrics have been used to line the containers in order to meet these requirements. Such fabrics have included resin-bonded nonwoven rayon fabrics and thermal bonded rayon-polypropylene fabrics.

The present invention provides a fabric that is particularly suitable for use as a liner for floppy disc protective containers.

BRIEF SUMMARY OF THE DRAWINGS

FIG. 1 is a schematic side view of an arrangement of apparatus suitable for producing the fabric of the invention;

FIG. 2 is a cutaway view of a floppy disc contained in a protective container lined with the fabric of the invention;

DETAILED DESCRIPTION OF THE INVENTION

Figure 3:
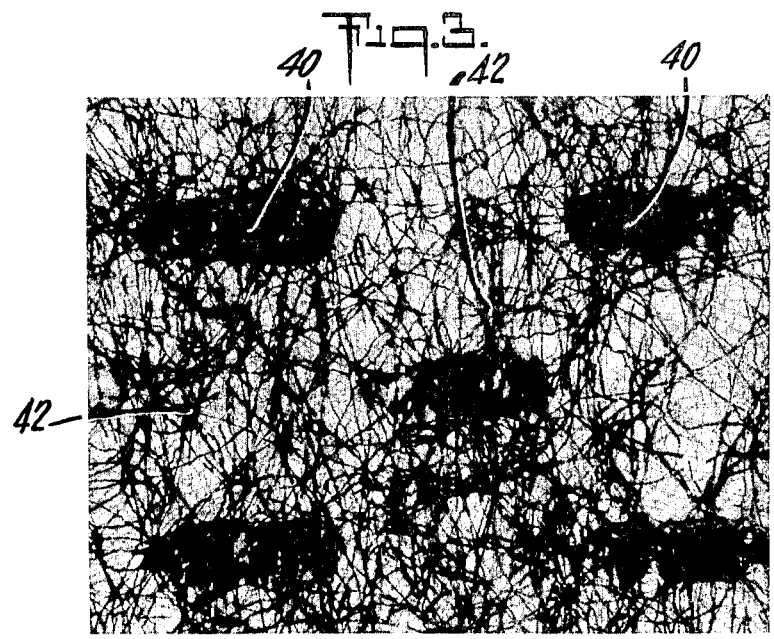
FIG. 3 is a photomacrograph, taken at 15×, of the fabric employed in the invention.

The fabric employed in the invention is a thermal-/emboss bonded fabric composed of conventional or textile grade staple length polyester fibers and staple length low melting polyester fibers. The fibers employed will usually have a denier within the range of from about 1 to about 6, and are at least about ½ inch long, up to about 3 or 4 inches long.

The proportion of the two fibers has not been found to be narrowly critical. The low melting polyester fiber is employed in a proportion sufficient to effect thermal bonding of the fabric. For instance, the low melting polyester is usually employed in amounts of from about 30 to about 60 weight percent, based on weight of the two fibers.

The low melting polyester is less crystalline than the usual textile grade polyester fiber. It has a melting point sufficiently low to be readily fusion bonded on conventional equipment. For instance, the low melting polyester fibers have melting points below about 150° C. and down to about 95° to 100° C. The nature and preparation of such low melting polyester fibers are known in the art.

The fabrics employed in the invention are produced by first forming a fibrous web comprising a loose array of a mixture of the two fibers, as by carding, air laying, or the like. It is preferred to employ a card, or a dual rotor such as is described by Ruffo et al. in U.S. Pat. No. 3,768,118, as the web forming device, although other web forming devices can be used if desired. The exact weight of the fibrous web has not been found to be narrowly critical. Typical web weights are from about ½ ounce to about 3 ounces per square yard. The lighter weights, below about 1½ ounces per square yard, are preferred.

FIG. 1 shows an arrangement of apparatus that can be used to produce the fabrics employed in the invention. A web of loose fibers can be produced by a card 10 or by a dual rotor 12 (which is itself preferably fed by one or more cards 14). This web 16, comprising a loose array of a mixture of the two types of polyester fibers, is laid on an endless belt 18 and is conveyed to a heated embossing calender 20. The heated embossing calender 20 comprises a pair of heated counterrotating rolls 22, 24, one of which is smooth and the other contains a pattern of raised emboss points on the surface. The emboss points can be dots, dashes, annulae, etc., and should be spaced apart in both the machine and cross direction a distance less than about one-half the average staple length of the fibers in the web, and preferably less than about one-quarter of said length. The use of such embossing rolls to bond nonwoven fabrics containing fusible fibers is known in the art.

The embossing rolls are heated to a temperature sufficient to form fused emboss points on the web. The selection of specific temperatures depends upon factors such as melting point of the low melting polyester fiber, use of preheaters, web speed through the embossing calendar, web weight, etc. Usually, the temperature will be within the range of from about 130° C. to about 200° C.

The thermal embossing of the web suffices to impart structural integrity to the finished fabric. However, optimum performance in the floppy disc liner application requires also that the fabric provide minimum resistance to the disc's rotation within the protective container. To achieve this desired result, it is required that there be little or no loose fiber ends, or fuzziness, between the thermally embossed areas. Overall thermal bonding of the fabric is required to "tie down" the loose fiber ends between the embossed areas. In some cases, this can be achieved through the use of heated embossing rolls, alone. However, it is preferred to use an auxiliary thermal bonding step. In FIG. 1, two alternatives are shown. The first alternative is the use of a belt bonder 26 wherein the fibrous web 16 is carried around steam cans 28 while compressed between two carrier belts 30, 32 under moderate pressure. The steam cans 28 are maintained at a temperature sufficient to thermally bond the web 16. The selection of temperatures in specific cases is dependent upon the same factors discussed above with respect to the heated embossing rolls.

A second alternative is the use of a heated smooth calender 34, heated to a temperature sufficient to effect thermal bonding. (Again, the temperature selected is dependent upon the same factors discussed above.) In FIG. 1, the belt bonder 26 is shown in the line before the embossing calender 20, and the smooth calender 34 is shown after the embossing calender 20. This arrangement is not required, and can be reversed, if desired.

After the web has been thermally embossed, and if used, subjected to the auxiliary thermal bonding step, the finished fabric 36 is collected on a conventional windup 38.

The examples below illustrate the invention.

EXAMPLE 1

A 50/50 (by weight) mixture of Fiber A (Celanese Fortrel Type 310 polyester, 1.5 denier, 1½-inch staple) and Fiber B (a low melting polyester 2.25 denier, 1½ inch staple fiber—the polyester polymer from which the fiber was drawn had a DSC melting point of 130° C. and a density of 1.24 grams per cubic centimeter) was processed through an opener/blender and fed to a card, which deposited a 240 grains per square yard web on an endless belt, as shown in FIG. 1. The web was belt bonded, as shown in FIG. 1, by passing around steam cans that were operated at 80 psig steam pressure (155° C.). The belt pressure was 14 pounds per square inch. The dwell time in the heated zone was 36 seconds.

After passing through the belt bonder, the web was passed through the nip of an embossing calender at a speed of 10 to 15 meters per minute. Both rolls (i.e., embossed and smooth) of the embossing calender were operated at 151° C. The pressure at the nip was 32-34 kilonewtons. The embossed roll had a raised dash pattern wherein each dash measured 0.9 mm by 2.5 mm. Each dash was raised 22 thousandths of an inch. There were 14 lines of dashes in the machine direction and 5.3 dashes per inch in the cross direction.

The fabric was collected on a windup after passing through the embossing calender.

Figure 4:
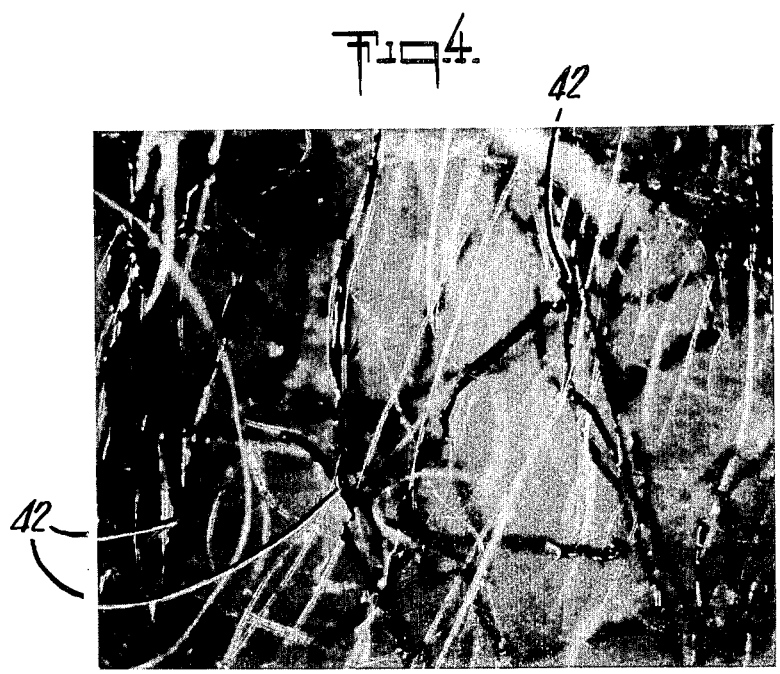
FIG. 4 is a photomacrograph of the same fabric taken at 50×.

Photomacrographs of this fabric, originally taken at 15× and 50×, are shown, respectively, as FIGS. 3 and 4. The fabric samples were differentially stained so that the low melting polyester fiber is dark and the conventional polyester is light. This can be seen most clearly in FIG. 4. The fused embossed areas 40 can be seen clearly in FIG. 3. In both FIGS. 3 and 4, thermal bonded points 42 can be seen between the embossed areas 40.

The fabric of this Example was laminated to a polyvinyl chloride sheet by hot needle punching. The lined sheet was then fabricated by known procedures into a floppy disc envelope container as shown in FIG. 2. The container 44 containing the floppy disc 46 comprises a first outer sheet 48 lined with a first layer 50 of the fabric of the invention, and a second outer sheet 52, which is lined with a second layer 54 of the fabric of the invention. The two outer sheets 48, 52 are joined on three sides 56, 58, 60, and are unjoined on the fourth side 62. In use, the disc 46 is spun inside the container 44, and is "read" through the window 64.

The fabric of Example 1 performed excellently as the floppy disc liner in the following respects:

(a) It was readily laminated to the polyvinyl chloride sheet by hot needle punching;

(b) It die cut cleanly when the window and other holes were cut in the liner;

(c) It had low static and dynamic friction properties, and therefore did not unduly interfere with the rotation of the disc in the container; and (d) It did not interfere with the magnetic signals impressed on the disc.

EXAMPLE 2

Example 1 was repeated, with the following differences: First, the low melting polyester fiber was made from a polyester having a DSC melting point of 105° C. Second, the web weighed 523 grains per square yard, and third, the embossed web (which had not been belt bonded) was smooth roll calendered at 142° C. The embossing was done at 135° C. The line speed was 53 feet per minute.

The fabric of Example 2 was used as a floppy disc liner as described in Example 1, with excellent results.

What is claimed is:

1. A floppy disc envelope container comprising sheet material fabricated into an envelope, said sheet material having an inner surface on which is laminated a fabric comprising a thermal bonded and emboss bonded nonwoven fabric comprising textile grade polyester staple fibers and polyester staple fibers having a melting point below about 150° C.

2. The floppy disc envelope container of claim 1 wherein said sheet material is polyvinyl chloride.

* * * * *